United States Patent
Gosselink et al.

(10) Patent No.: US 10,717,073 B2
(45) Date of Patent: Jul. 21, 2020

(54) PROCESS FOR PREPARING PROTECTED RESIN CATALYSTS

(71) Applicant: BASF Corporation, Florham Park, NJ (US)

(72) Inventors: Rob Gosselink, Arnhem (NL); Robert Johan Andreas Maria Terörde, De Meern (NL)

(73) Assignee: BASF Corporation, Florham Park, NJ (US)

( * ) Notice: Subject to any disclaimer, the term of this patent is extended or adjusted under 35 U.S.C. 154(b) by 20 days.

(21) Appl. No.: 16/306,187

(22) PCT Filed: May 31, 2017

(86) PCT No.: PCT/IB2017/053194
§ 371 (c)(1),
(2) Date: Nov. 30, 2018

(87) PCT Pub. No.: WO2017/208164
PCT Pub. Date: Dec. 7, 2017

(65) Prior Publication Data
US 2019/0283013 A1    Sep. 19, 2019

(30) Foreign Application Priority Data

May 31, 2016    (NL) ..................... 2016865

(51) Int. Cl.
*B01J 37/02*    (2006.01)
*B01J 23/755*   (2006.01)
(Continued)

(52) U.S. Cl.
CPC ......... *B01J 37/0219* (2013.01); *B01J 21/063* (2013.01); *B01J 21/08* (2013.01);
(Continued)

(58) Field of Classification Search
CPC ...... B01J 37/0219; B01J 21/08; B01J 37/023; B01J 35/0053; B01J 21/063; B01J 37/04;
(Continued)

(56) References Cited

U.S. PATENT DOCUMENTS 2,842,504 A * 7/1958 Jones ..................... C08C 19/02
502/159
6,294,498 B1 * 9/2001 Darcissac .............. B01J 23/882
502/159

(Continued)

FOREIGN PATENT DOCUMENTS

| WO | 2004/035204 | 4/2004 |
| WO | 2013/088411 | 6/2013 |
| WO | 2015/008247 | 8/2015 |

OTHER PUBLICATIONS

International Search Report for International Application No. PCT/IB2017/053194 dated Aug. 16, 2017, 4 pgs.

*Primary Examiner* — Ali Z Fadhel
(74) *Attorney, Agent, or Firm* — Lowenstein Sandler LLP

(57) ABSTRACT

The invention is in the field of catalysis. More specifically, the invention relates to a process for preparing a protected metal catalyst on a support; a matrix particle comprising the protected metal catalyst; and, a process for hydrogenating a hydrocarbon resin feedstock using the protected metal catalyst.

17 Claims, 1 Drawing Sheet

(51) Int. Cl.
| | |
|---|---|
| B01J 33/00 | (2006.01) |
| B01J 35/00 | (2006.01) |
| B01J 35/02 | (2006.01) |
| C08L 25/06 | (2006.01) |
| C08L 25/08 | (2006.01) |
| C10G 49/04 | (2006.01) |
| B01J 21/08 | (2006.01) |
| B01J 21/06 | (2006.01) |
| B01J 37/04 | (2006.01) |
| B01J 21/14 | (2006.01) |
| B01J 21/10 | (2006.01) |
| B01J 21/12 | (2006.01) |
| B01J 37/18 | (2006.01) |
| B01J 35/10 | (2006.01) |

(52) U.S. Cl.
CPC .............. *B01J 21/10* (2013.01); *B01J 21/12* (2013.01); *B01J 21/14* (2013.01); *B01J 23/755* (2013.01); *B01J 33/00* (2013.01); *B01J 35/0053* (2013.01); *B01J 35/0093* (2013.01); *B01J 35/023* (2013.01); *B01J 35/026* (2013.01); *B01J 37/023* (2013.01); *B01J 37/0217* (2013.01); *B01J 37/0221* (2013.01); *B01J 37/04* (2013.01); *B01J 37/18* (2013.01); *C08L 25/06* (2013.01); *C08L 25/08* (2013.01); *C10G 49/04* (2013.01); *B01J 35/1019* (2013.01); *B01J 35/1042* (2013.01)

(58) Field of Classification Search
CPC ... B01J 21/14; B01J 21/10; B01J 21/12; B01J 37/18; B01J 35/026; B01J 23/755; B01J 33/00; B01J 35/0093; B01J 35/023; B01J 37/0217; B01J 37/0221; B01J 35/1019; B01J 35/1042; B01J 37/0072; C08L 25/06; C08L 25/08; C10G 49/04
See application file for complete search history.

(56) References Cited

U.S. PATENT DOCUMENTS

| | | | |
|---|---|---|---|
| 2004/0157731 A1* | 8/2004 | Wolfe | B01J 33/00 502/159 |
| 2006/0189479 A1* | 8/2006 | Even | B01J 33/00 502/159 |
| 2006/0276577 A1 | 12/2006 | Lee et al. | |

* cited by examiner

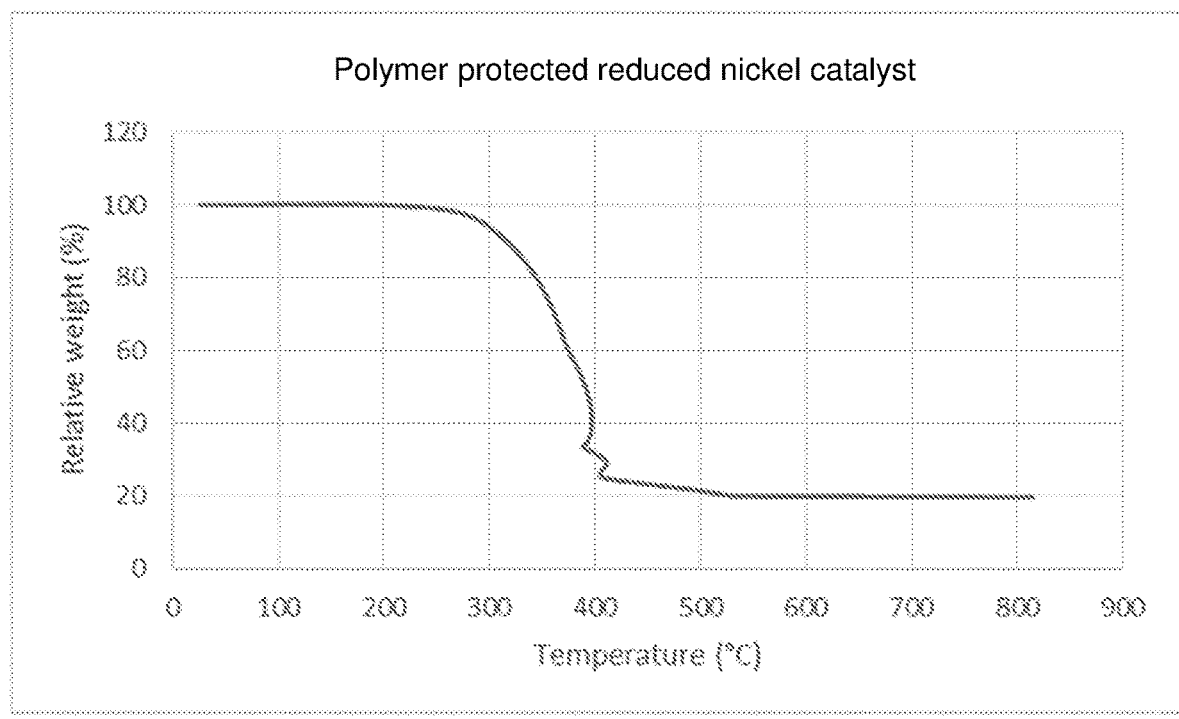

PROCESS FOR PREPARING PROTECTED RESIN CATALYSTS

CROSS-REFERENCE TO RELATED APPLICATIONS

This application is a national phase entry under 35 U.S.C. § 371 of International Application No. PCT/IB2017/053194, filed on May 31, 2017, which claims the benefit of priority of Foreign Application No. NL 2016865, filed on May 31, 2016. The contents of these applications are hereby incorporated by reference herein in their entirety.

The invention is in the field of catalysis. More specifically, the invention relates to a process for preparing a protected metal catalyst on a support; a matrix particle comprising the protected metal catalyst; and, a process for hydrogenating a hydrocarbon resin feedstock using the protected metal catalyst.

The market for hydrogenated hydrocarbon resins, such as adhesives used in for example packaging and nonwoven articles, is growing with an expected compound annual growth rate of 11% for 2015 to 2020, as reported in QYResearch Petroleum Resin Research Centre: 2015 Market Research Report on Global Petroleum Resin Industry. Hydrogenation of these resins enables various properties of the hydrocarbon resin to be modified so as to decrease its color and improve its stability towards heat, oxygen, and ultraviolet light and obtain the desired commercial water-white hydrocarbon resin product, which typically has a molten Gardner color of <1.

Most commonly nickel powder catalysts are applied in the hydrogenation of hydrocarbon resins. Such catalysts are currently produced by a process comprising precipitation, reduction and stabilization steps. However, there are numerous disadvantages associated with the production of these nickel powder catalysts. The risk of dust formation during the production process is of high concern, especially of carcinogenic, mutagenic and reprotoxic (CMR) substances, such as some nickel compounds, with more stricter health and safety regulations coming into force (effect) over time. Additionally, such powdered nickel catalysts can be pyrophoric or pyrogenic, with self-ignition temperatures typically much lower than room temperature if not stabilized. Consequently, extra caution is required to be taken on exposure to air or a lengthy and therefore costly stabilization step is needed to protect the catalyst for packing and transport.

Processes for protecting and stabilizing metal catalysts are known in the art. WO-A-2004/035204, WO-A-2011/133037 and U.S. Pat. No. 6,281,163 describe a process for protecting a catalyst using a hardened vegetable oil or fat as a protective material for protecting a hydrogenation catalyst. However, the disadvantage of this means of protecting in case this would be applied to a catalyst for a hydrocarbon resin hydrogenation process, is that the materials used for the protective coating are not compatible with a hydrocarbon resin feedstock due to differences in physical properties, such as molecular weight, softening point etc. Consequently, it would lead to contamination of the hydrogenated hydrocarbon end product with the hardened vegetable oil or fat.

U.S. Pat. No. 6,294,498 describes a process for passivation of a heterogeneous catalyst used for hydrocarbon hydroconversion reactions, in which process the external surface of the catalyst is coated with a protective layer of an inert material in an amount of less than 50% of the pore volume of the catalyst or, for example, less than 30% by weight relative to the catalyst. U.S. Pat. No. 6,294,498 also describes that the inert material may be atomized or dispersed onto the catalyst, or, by dissolving the inert material in a liquid which is then atomized, sprayed or dispersed onto the catalyst. The disadvantage of this process is that it is unsuitable for protecting fine powder catalysts (such as catalysts typically having an average volume particle size of less than 50 μm), because the amount of inert material used is below the pore volume of the catalyst which would result in an incomplete coating of the catalyst and inhomogeneity. Consequently, the non-coated catalyst surface of the catalyst would oxidize upon exposure to air leading to a decrease in the reduction value ratio (RVR). The RVR is defined herein as the amount of reduced metal (e.g. nickel) divided by the total amount of said metal in the catalyst, which is then multiplied by 100%. Further, U.S. Pat. No. 6,294,498 describes that the inert material may be a petroleum hydrocarbon, synthetic hydrocarbon, natural product or polymer. However, U.S. Pat. No. 6,294,498 does not describe that the inert material used in its process should have properties which are compatible to those of the hydrocarbon resin feedstock so as to minimize its impact on the properties of the hydrogenated hydrocarbon resin product obtained. Further, the coated catalyst powder produced by this method is typically in the form of a large piece which makes it difficult to handle. Such a protected powder catalyst also cannot be readily processed further into flakes, droplets or the like, because in order to shape such a large piece it needs to be remelted. This will result in pore filling the coating material would diffuse into the pores due to capillary action with a subsequent viscosity increase. As such this material cannot be processed anymore.

WO-A-2013/088411 describes a process for protecting a reduced metal catalyst using an organic liquid in an amount of up to five times the amount required for incipient wetness, and wherein the liquid has a flash point of >40° C. and a boiling point of <300° C. Although an improvement over known processes in that the liquids used not only protect the reduced catalyst but can be readily removed and are inherently harmless to the product, this process has the disadvantage in that upon exposure to air a limited amount of oxidation of the reduced metal occurs resulting in a reduced RVR. Consequently, the reduced/stabilized catalyst obtained by the process of WO-A-2013/088411 would require, for some chemical reactions, an additional activation step prior to use. In particular for an in-situ activation at a lower reaction temperature, since such a reduced/stabilized catalyst would have a lower catalytic activity because not all stabilized Ni species would be reactivated immediately.

Therefore, there is a need for a process for protecting a Ni metal powder catalyst wherein it is possible to use the protected catalyst obtained directly in a process for the hydrocarbon resin hydrogenation without substantially influencing the properties of the resulting hydrogenated product.

Accordingly, it is an object of the invention to provide a metal catalyst, in particular a nickel metal powder catalyst, that is protected in an improved way that it can be used directly in a process for the hydrogenation of a hydrocarbon resin feedstock (such as a petrochemical resin feedstock) without substantially influencing the material properties of the hydrogenated product obtained or that said catalyst does not need to be subjected to an additional activation step prior to use in a chemical reaction. It is a further object that the catalyst is protected in such a way that it can be packed, shipped and processed safely and easily, without the risk of spontaneous ignition and where also the formation of toxic particles is avoided.

Surprisingly one or more of these objects are achieved by a process for preparing a protected metal catalyst in which a material, in particular a polymer, having a specific weight average molecular weight (i.e. $M_w$) is used in a specific amount.

Accordingly, in a first aspect the invention is directed to a process for preparing a protected metal catalyst on a support, which process comprises contacting and mixing a metal catalyst on a support with a molten polymer in an inert atmosphere thereby forming a slurry, wherein said catalyst comprises nickel and the support is in the form of a powder, wherein the polymer has a weight average molecular weight ($M_w$) of 1000-35000 Daltons, a glass transition temperature ($T_g$) of at least 50° C., and a viscosity of at most 1000 cP, as measured by a Brookfield viscometer using a spindle no. 3 at 50 rpm and at a temperature of 300° C., and wherein the amount of polymer used is at least 60 wt. %, based on the total weight of the metal catalyst on the support and the polymer.

The term "or" as used herein is defined as "and/or" unless specified otherwise.

BRIEF DESCRIPTION OF THE DRAWINGS

FIG. 1 depicts thermogravimetric (TGA) analysis of a polymer protected reduced nickel catalyst of the invention.

DETAILED DESCRIPTION

The term "a" or "an" as used herein is defined as "at least one" unless specified otherwise, or it follows from the context that it should refer to the singular only.

When referring to a noun (e.g. a compound, an additive, etc.) in the singular, the plural is meant to be included, or it follows from the context that it should refer to the singular only.

The term "substantial(ly)" or "essential(ly)" is generally used herein to indicate that it has the general character or function of that which is specified. When referring to a quantifiable feature, these terms are in particular used to indicate that it is for at least 75%, more in particular at least 90%, even more in particular at least 95% of the maximum that feature.

The phrase "the metal catalyst on the support" is abbreviated herein as "the metal catalyst" or "the catalyst".

The term "metal" is generally used herein in a strict sense, namely to refer to the metallic form of one or more elements (i.e. the metal is "reduced" or is a "reduced metal", unless specified or evident otherwise (e.g. when referring to metal ions or to a metal salt or a metal promoter). Thus, the terms "metal catalyst" and "the catalyst" are used for a catalyst that comprises at least one catalytically active metallic element (characteristically nickel) on a support. A specific form of a metal is an alloy.

The term "hydrocarbon resin feedstock" is abbreviated herein as "feedstock".

The term "hydrocarbon resin" is also referred herein as "petrochemical resin" and "petroleum resin".

The "styrene copolymer" is also referred to herein as "polystyrene copolymer".

Typically the mixing is carried out in such a manner that the metal catalyst is substantially homogeneously distributed within the molten polymer thereby forming a slurry. Mixing can be carried out using common mixing equipment, such as by shaking, using stirrers (such as magnetic stirrers) or rotors, ribbon blenders, sonication, and the like. The mixing is carried out for a sufficient amount of time to produce a substantially homogenous distribution of the metal catalyst in the molten polymer and is typically for a period of 5 minutes to 1 hour.

The polymer used in the process of the invention, typically has a weight average molecular weight of 1000-35000 Daltons, preferably 1500-30000 Daltons, more preferably 2000-25000 Daltons, even more preferably 2500-20000, most preferably 3000-15000 Daltons, and in particular 2000-10000 Daltons. Preferably, the $M_w$ is determined by gel permeation chromatography (GPC). In particular, the $M_w$ is the value which can be determined by GPC using the following method in which a High Speed GPC Column with Waters Alliance® System 2695 Separations Module and Waters 2414 Refractive Index Detector using 2 Waters Styragel HT 6E 7.8×300 mm columns are used in series with a Waters Styragel guard column, 20 μm, 4.6 mm×30 mm. The flowrate typically used is 1.2 mL/min tetrahydrofuran eluent, while the detector and columns are heated to a temperature of 40° C. and Agilent EasiVial and EasiCal polystyrene calibration standards and a global standard (J-678) calibration check are used. Polymer samples are typically prepared in THF and filtered with a 0.45 um PTFE filter. The GPC peak integration is typically cutoff at 270 Dalton.

Typically, the polymer suitable to be used in the process of the invention has a $T_g$ of at least 50° C., and preferably at least 55° C. The term "glass transition temperature" ($T_g$), as defined herein, refers to the temperature at which the glass transition occurs in amorphous solid materials, such as polymers. The amorphous state at a lower temperature than this glass transition point is known as the glass state, while the material (e.g. polymer) is held to be in a liquid or rubber state at temperatures higher than the glass transition point. Any generally used technique that is known in the art may be used to determine the $T_g$. Preferably, the method used for determining the $T_g$ is differential scanning calorimetry (DSC). In particular, the $T_g$ is the value which can be determined by DSC using the following method in which a TA Instruments Q2000 DSC of TA Instruments Inc., wherein a polymer sample is first heated to 180° C. at a rate of 10° C./min under an inert (nitrogen) atmosphere, then cooled to a temperature of at least −10° C. at a rate of 10° C./min, followed by a second heating in which the polymer sample is heated at a rate of 10° C./min to a temperature of at least about 90° C., and then determining the inflection point or mid-point from the slope tangent lines drawn from the heat flow baseline before and after the transition using an algorithm that is programmed into the instrument software i.e. this is determined based on the DSC curve obtained at the second heating in the DSC measurement, and defined as a temperature of an intersection point where a straight line equidistant from two extrapolated baselines of high temperature side and low temperature side as measured in the vertical axis direction intersects a segment of the curve showing a step change of glass transition.

Suitable polymers typically have a viscosity of at most 1000 cP, as measured by a Brookfield viscometer using a spindle no. 3 at 50 rpm and at a temperature of 300° C., preferably at most 500 cP, as measured by a Brookfield viscometer using a spindle no. 3 at 50 rpm and at a temperature of 180° C., more preferably at most 300 cP, as measured by a Brookfield viscometer using a spindle no. 3 at 50 rpm and at a temperature of 180° C., and even more preferably at most 200 cP, as measured by a Brookfield viscometer using a spindle no. 3 at 50 and at a temperature of 180° C.

The Brookfield viscosity, in particular, is the value which can be measured at a temperature of either 300° C. or 180° C. using a Brookfield Model RVF Synchro-Lectric Viscometer as supplied by Brookfield Engineering Laboratories Incorporated of Middleboro, Mass. Typically, a Brookfield Viscometer comprises a rotatable spindle which carries a disc which, when performing the measurement, is immersed into the molten polymer. The molten polymer is typically provided in a cylindrical container having a diameter of at least 100 mm so as to avoid errors due to the proximity of the container walls.

To perform the measurement typically a Brookfield No. 3 spindle is chosen, immersed into the molten polymer and then rotated at 50 rpm for at least three revolutions. The spindle is typically coupled to a torque measuring device which is calibrated to express torque in terms of the viscosity of the composition either directly or after the operation of a multiplier of 20 as specified by Brookfield.

Polymers suitable to be used include homopolymers and/or copolymers (such as graft, block and random copolymers). The polymer may be linear, branched, and/or cyclic, and is preferably linear. In a preferred embodiment, the polymer used is polystyrene and/or a polystyrene copolymer (i.e. a styrene copolymer). A suitable copolymer which may be used according to the process of the invention typically comprises styrene and a monomer selected from the group of an ethylene, butylene, α-methylstyrene and combinations thereof.

Surprisingly, the use of such a polymer, in particular polystyrene and/or a styrene copolymer, in the process of the invention produces protected metal catalysts which can be directly used in hydrogenation processes of hydrocarbon resins, since said polymer is compatible both with the feedstock used and the product obtained.

Typically, the amount of polymer used is at least 60 wt. %, preferably at least 65 wt. %, more preferably at least 70 wt. % and most preferably at least 75 wt. %. All wt. %'s are based upon the total weight of the catalyst and the polymer.

The amount of polymer used is typically at most 95 wt. %, preferably at most 90 wt. %, more preferably at most 85 wt. %, and most preferably at most 80 wt. %. All wt. %'s are based upon the total weight of the catalyst and the polymer.

The melting temperature of the polymer with which the catalyst is coated is preferably less than the temperature at which the hydrogenation reaction is carried out, in order to facilitate dissolution of the polymer at the beginning of a hydrogenation process. In particular, when the catalyst is used in a slurry process, the polymer coating will preferably dissolve in the feedstock.

In a preferred embodiment, the polymer is heated to a temperature of 120-300° C., thereby melting the polymer, prior to contacting and mixing the molten polymer with the catalyst.

The term inert atmosphere as defined herein as an atmosphere comprising at most 5 mass % of oxygen. Preferably, the inert atmosphere comprises nitrogen gas or argon gas.

Typically, the catalyst comprises nickel in an amount of 20-80 wt. %, calculated as metallic nickel based on the weight of the metal catalyst on the support.

The catalyst may further comprise a metal promoter, preferably selected from the group consisting of cobalt, zinc, magnesium, iron, molybdenum, manganese, tungsten and combinations thereof. The amount of the one or more metal promoters present in the catalyst is preferably 0.25-12 wt. %, more preferably 1-10 wt. %, and even more preferably 1-5 wt. %, calculated as metallic oxide and based on the weight of the metal catalyst on the support.

The support may be selected from the group consisting of silica, alumina, zirconia, titanium oxide, ceria, magnesium oxide, zinc oxide, metal silicates (e.g. titanium silicates (TiS)), metal aluminates, zeolites and combinations thereof.

Typically, the support is in the form of a powder. The particle size distribution of the support, in particular the volume median diameter $D(v,0.5)$, wherein $D(v,0.5)$ is the diameter where 50% of the distribution is above and 50% is below, is typically 1-30 μm, preferably 2-20 μm and more preferably 3-15 μm. $D(v,0.5)$, as used herein, is the value as measured by laser diffraction with a Malvern MS 2000 system and sampling unit Hydro 2000G, which corresponds to a measuring range of 0.02-2000 μm using the "General purpose" as the model for calculating the particle size distribution.

The BET surface area of the metal catalyst is preferably between 200 to 350 $m^2/g$. The BET surface area, as used herein, is the value that can be measured by determining the amount of nitrogen adsorbed at 77 K and $P/P_o$ of approximately 0.3 and assuming a nitrogen cross section area of 16.2 $Å^2$, after degassing the catalyst sample at 300° C. on a Micromeritics ASAP 2420.

The nickel surface area of the catalyst (in active form) will preferably have hydrogen adsorption capacity (HAC) ranging from 35-70 ml $H_2$/g Ni. The nickel surface area as used herein is the value that can be determined as follows. Hydrogen desorption is performed on a sample of 0.1 g of a reduced nickel catalyst in a Micromeretics AutoChem 2920 chemisorption analyzer. The sample activated at 250° C. for 2 hours and is then cooled to −65° C. with liquid nitrogen. Subsequently, the hydrogen adsorption capacity (HAC) of the sample is determined by measuring the amount of hydrogen that desorbs during heating in a flow of argon (20 ml/min) from −65 to 700° C.

The total pore volume for the metal catalyst on the support is at least 0.5 ml/g, preferably at least 0.6 ml/g, more preferably at least 0.65 ml/g. Unless explicitly indicated otherwise, all total pore volumes expressed herein are measured on a Quantachrome™ Autosorb™ 6 by $N_2$ desorption in the pore range of 20-600 Å.

The upper limit is not particularly critical. Very good results have been achieved with total pore volumes up to 0.8 ml/g.

In a specific embodiment, the metal catalyst typically has micropores and/or mesopores, as classified by IUPAC 1994, which have pore diameters of <2 nm and 2-50 nm, respectively.

The advantage of the protected metal catalyst produced by the process of the first aspect of the invention is that it causes substantially no contamination in the hydrogenation process in which it is used. It is of further advantage that typically the selectivity of the catalyst is not compromised by the protection process and that there is only a limited decrease in activity in comparison to the activity of a standard stabilized catalyst.

In addition, the protected catalyst of the invention is surprisingly stable towards spontaneous ignition up to a temperature of about 200° C., as determined by thermogravimetric (TGA) analysis, as shown in FIG. 1. In contrast, commercially protected resin catalysts are typically known to be stable only up to a temperature of about 100° C. Another advantage is that the process of the invention also adequately prevents the formation of dust. The present process is also advantageous in that it is less time consuming and more economically feasible than current methods. Further, the protected metal catalyst has the advantage that the protective polymer coating enables the metal catalyst to be stored for periods of time without substantially effecting the activity nor selectivity of the catalyst.

In a preferred embodiment, the protected metal catalyst is a matrix particle in the form of a flake or a droplet.

In a preferred embodiment, the protected metal catalyst prepared by the first aspect of the invention can be prepared as a matrix particle, in particular in the form of a flake or droplet, in a manner known per se, but preferably by either pouring the slurry or letting droplets of the slurry fall onto a surface (e.g. a metal plate), wherein said surface has a temperature less than the temperature of the slurry, and wherein preferably the temperature of the surface is less than 35° C.

Accordingly, in a second aspect the invention is directed to a matrix particle, in the form of a flake or a droplet, wherein said matrix particle comprises a metal catalyst on a support and a polymer, which is obtainable by the process according to the first aspect of the invention, which process further preferably comprises the step of pouring the slurry or letting one or more droplets of the slurry fall onto a surface, wherein said surface has a temperature which is less than the temperature of the slurry.

The matrix particle typically has an average size (as defined by the diameter of an enveloping circle) of 1 to 40 mm, preferably 1 to 20 mm, more preferably 2-15 mm, and even more preferably 5-10 mm.

The advantage of the protected metal catalysts prepared by the first aspect of the invention being a matrix particle in the form of a flake or droplet over conventionally protected powder metal catalysts, which are typically in the form of slurries, is that the matrix particle, is more readily usable, requires no processing before use as it can be used directly in the hydrogenation process and is easier to handle and transport than slurries.

In a preferred embodiment, the process of the first aspect of the invention may be used to protect metal catalysts suitable for hydrogenation of hydrocarbon resin feedstocks.

Accordingly, in a third aspect the invention is directed to a process for the hydrogenation of a hydrocarbon resin feedstock, wherein said hydrocarbon resin feedstock is contacted with hydrogen in the presence of a protected metal catalyst obtainable by the process according to the first aspect of the invention.

The feedstock typically comprises a hydrocarbon resin, a liquid and optionally a contaminant. The liquid is usually an organic solvent. Suitable organic solvents are known in the art and may be selected from the list consisting of C10-C13 aliphatic hydrocarbon liquids, hydrodesulfurized heavy naptha, white spirits, tetralin, aromatics, esters, ethers and combinations thereof. A typical contaminant which may be present in the feedstock includes sulfur compounds, nitrogen compounds, chlorine compounds anchor fluorine compounds.

Hydrocarbon resin feedstocks which may be used are typically produced either from C5 or C9 petroleum fractions or their by-products, as well as combinations thereof, through distillation, pretreatment and polymerization. Such hydrocarbon resins typically are low weight average molecular weight polymers (i.e. between 300-3000 Daltons) comprising an aliphatic backbone and optionally one or more aromatic and/or aliphatic side groups.

In a preferred embodiment, the hydrocarbon resin feedstock used is a C5 (aliphatic) or C9 (aromatic) hydrocarbon (petroleum/petrochemical) resin feedstock.

Preferably, the hydrogenation process is a slurry process. The hydrogenation process may be a batch or continuous process.

Suitable temperatures and pressures for carrying out the hydrogenation process are based on the properties of the resin, the properties required of the end-product and the actual composition and structure of the catalyst.

Suitable temperatures are generally from 100 to 350° C., preferably from 250 to 325° C., and more preferably from 250 to 300° C. Suitable partial hydrogen pressures can be from 1 to 150 bar (abs), and preferably from 50 to 100 bar (abs). The hydrogenation time is mainly dependent on the temperature, amount of catalyst and required degree of hydrogenation of the resin.

For the purpose of clarity and a concise description features are described herein as part of the same or separate embodiments, however, it will be appreciated that the scope of the invention may include embodiments having combinations of all or some of the features described.

The various aspects of the invention are now illustrated on the basis of the following non-limiting examples.

EXAMPLES

A reduced powdered nickel catalyst on a support, corresponding to Example 1, was prepared according to that reported in WO-A-01/36093. Solutions containing nickel and alumina salts, silicate and sodium carbonate were mixed in a well stirred precipitation vessel at a temperature of 95° C. The pH of the slurry formed was about 7.5 and after 1 hour the precipitation was completed. After washing the precipitate, the precursor of the catalyst was filtered and dried in an oven at 110° C. The catalyst was activated with hydrogen. The composition and the physical properties of the resulting unprotected catalyst is specified in Table 1 below. The total pore volume, BET surface area, HAC and D(v,0.5) values were determined as described above.

TABLE 1

| Characteristics of catalysts of Example 1 | | |
|---|---|---|
| | | Example 1 |
| Ni | wt. % | 67.7 |
| SiO$_2$ | wt. % | 25 |
| Al$_2$O$_3$ | wt. % | 2 |
| Total Pore Volume | ml/g | 0.75 |
| BET surface area | m$^2$/g | 310 |
| HAC | ml H$_2$/g Ni | 43.8 |
| D (v,0.5) | μm | 6 |

Protected Example 1: (Comparative)

20 g of freshly reduced supported nickel catalyst of Example 1 was placed in a tube furnace reactor and subjected to a flow of N$_2$ of 60 dm$^3$/hr until a temperature of 60° C. was reached. Then the N$_2$ flow was adjusted to 175 dm$^3$/hr plus 4.5 dm$^3$/hr of air (resulting in an oxygen content of 0.5 vol. % in the stabilization gas). Upon a slow dropping of the bed temperature, gradually, the N$_2$ flow was decreased to 100 dm$^3$/hr (resulting in a final oxygen content in the stabilization gas of 1.2 vol. %). The resulting situation was kept steady during a period of 18 hours. After a short flush with 100% air for an additional 2 hours the sample was collected as a dusty fine powder.

Upon exposure to air no colour change was observed for the protected catalyst of Example 1.

Protected Example 2: Preparation of 11 wt. % Ni in Low Mw (2,800 g/Mol) Polystyrene 20 g of polystyrene (Joncryl ADF 1300, BASF, having a weight average molecular weight of 2800 g/mol, $T_g$ of 56° C. and a viscosity of 300 cP, as measured by a Brookfield viscometer using a spindle no. 3 at 50 rpm and at a temperature of 180° C., as determined according to the methods described herein) in a 100 mL glass beaker is melted at a temperature of 140-200° C. and stirred using a magnetic stirrer at 500-600 rpm. Subsequently 4 g of the catalyst corresponding to Example 1 was added to the molten polystyrene in a nitrogen containing glove box over a period of about 10 min at a temperature of 200° C. The catalyst is then mixed using the magnetic stirrer at 500-600 rpm into the molten polystyrene at a temperature of 200° C. for a further 10 min to produce a slurry. The slurry was then poured into a steel plate having a temperature of less than 35° C. The slurry was then cooled for a period of 1 to about 1.5 min in the nitrogen containing glove box (i.e. under inert conditions) to the temperature of the steel plate which resulted in the formation of flakes having a thickness of about 0.3-0.4 cm and an average size of up to 3 cm.

Upon exposure to air no colour change from black of the reduced catalyst was observed for the protected catalyst of Example 2.

Protected Example 3: Preparation of Ni in High Mw (350,000 g/Mol) Polystyrene 20 g of polystyrene (441147 Sigma-Aldrich, having a weight average molecular weight of 350,000 g/mol, $T_g$ of 95° C. and a viscosity of >2000 cP, as measured by a Brookfield viscometer using a spindle no. 3 at 50 rpm and at a temperature of 180° C., as determined according to the methods described herein above) in a 100 mL glass beaker is heated to a temperature of 260° C.

Subsequently 0.1 g of the catalyst corresponding to Example 1 was added to the molten polystyrene in a nitrogen containing glove box at a temperature of 260° C. The heated polystyrene did not readily mix with the catalyst to form a slurry.

Upon exposure to air a colour change from black to grey was observed for the protected catalyst of Example 3. This indicated that the reduced Ni catalyst oxidized to NiO.

Activity Test

Catalytic performance of the catalysts corresponding to Example 1 and Protected Examples 1-2 was tested in resin hydrogenation based on Ni loading according to the following procedure.

75 g of a 50 wt. % hydrocarbon resin (containing 200 ppm S compounds, calculated as sulfur based on the weight of the hydrocarbon resin) solution in Exxsol D40 mixed with 0.75 grams each of the Example 1 and the Protected Examples 1-2 (which were exposed to air overnight prior to testing) which were heated in an autoclave under 20 bar hydrogen and agitated at 1400 rpm. As soon as the temperature reached 270° C., the hydrogen pressure was increased to 80 bar. The subsequent hydrogenation process was monitored by recording the hydrogen consumption. The reaction rate of the catalyst hydrogenating the hydrocarbon resin (RRH) is expressed by the reaction rate constant, which is obtained from performing a linear regression between 0% and 30% conversion, and is expressed in 1/h. After 2 hours the hydrogenation process is finished.

The activity was determined by first calculating the RRH values and then normalizing these values by the RRH value determined for the catalyst of Example 1.

The RVR values were determined as described herein above.

The results of these tests are specified in Table 2 below.

The reduction value ratio (RVR) did not substantially change for the Protected Example 2, unlike for Protected Example 1. This indicates that there is some oxidation of the nickel in the Protected Example 1, while in Protected Example 2 no further oxidation of the nickel occurs. The data in Table 2 shows that there is a slight decrease in the catalytic performance of Protected Example 2 in comparison with the Protected Example 1.

TABLE 2

Influence of different protection methods on the catalytic performance of Ni catalysts of Examples 1-2

| | Examples | | |
|---|---|---|---|
| | Ex. 1 | Protected Ex 1 | Protected Ex. 2 |
| RVR | 89.2 | 52.1 | 89.1 |
| RRH (h$^{-1}$) | 1.081 | 0.893 | 0.824 |
| Activity | 100 | 83 | 76 |
| Ni wt. % in flake | n/a | n/a | 11.0 |

The invention claimed is:

1. A process for preparing a protected metal catalyst on a support, which process comprises contacting and mixing a metal catalyst on a support with a molten polymer in an inert atmosphere thereby forming a slurry comprising the protected metal catalyst, wherein the metal comprises nickel and the support is in the form of a powder, wherein the polymer has a weight average molecular weight of 1000-35000 Daltons, a glass transition temperature of at least 50° C., and a viscosity of at most 1000 cP, as measured by a Brookfield viscometer using a spindle no. 3 at 50 rpm and at a temperature of 300° C., and wherein the amount of polymer used is at least 60 wt. %, based on the total weight of the metal catalyst on the support and the polymer.

2. The process of claim 1, wherein the amount of polymer used is at least 65 wt. % based on the total weight of the metal catalyst on the support and the polymer.

3. The process of claim 1, wherein the amount of polymer used is at most 95 wt. % based on the total weight of the metal catalyst on the support and the polymer.

4. The process of claim 1, wherein the polymer has a weight average molecular weight of 1500-30000 Daltons.

5. The process of claim 1, wherein the polymer has a viscosity of at most 500 cP, as measured by a Brookfield viscometer using a spindle no. 3 at 50 rpm and at a temperature of 180° C.

6. The process of claim 1, wherein the polymer is melted by heating to a temperature of 120-300° C.

7. The process of claim 1, wherein the polymer used is polystyrene and/or a polystyrene copolymer.

8. The process of claim 1, wherein the catalyst comprises nickel in an amount of 20-80 wt. %, calculated as metallic nickel based on the weight of the metal catalyst on the support.

9. The process of claim 1, wherein the support is selected from the group consisting of silica, alumina, zirconia, titanium oxide, ceria, magnesium oxide, zinc oxide, metal silicates (e.g. titanium silicates (TiS)), metal aluminates, zeolites and combinations thereof.

10. The process of claim 1, wherein volume median diameter D(v,0.5) of the support is 1-30 µm.

11. The process of claim 1, wherein the catalyst comprises one or more metal promoters, and, wherein the metal promoter is present in an amount of 0.25-12 wt. % calculated as metallic oxide and based on the weight of the metal catalyst on the support.

12. The process of claim 1, wherein the protected metal catalyst on the support is in the form of a flake or a droplet.

13. A matrix particle in the form of a flake or a droplet comprising a metal catalyst on a support and a polymer, said matrix particle is obtained from the process of claim 1, which process further comprises the step of pouring the slurry or letting one or more droplets of the slurry fall onto a surface, wherein said surface has a temperature which is less than the temperature of the slurry.

14. The matrix particle according to claim 13, wherein the matrix particle has an average size of 1 to 40 mm.

15. A process for the hydrogenation of a hydrocarbon resin feedstock, wherein said hydrocarbon resin feedstock is contacted with hydrogen in the presence of:

(A) a protected metal catalyst on a support obtainable by a process comprising contacting and mixing a metal catalyst on a support with a molten polymer in an inert atmosphere thereby forming a slurry, wherein the metal comprises nickel and the support is in the form of a powder, wherein the polymer has a weight average molecular weight of 1000-35000 Daltons, a glass transition temperature of at least 50° C., and a viscosity of at most 1000 cP, as measured by a Brookfield viscometer using a spindle no. 3 at 50 rpm and at a temperature of 300° C., and wherein the amount of polymer used is at least 60 wt. %, based on the total weight of the metal catalyst on the support and the polymer, or (B) a matrix particle in the form of a flake or a droplet comprising a metal catalyst on a support and a polymer, which is obtainable by a process comprising:

contacting and mixing the metal catalyst on the support with a molten polymer in an inert atmosphere thereby forming a slurry, and pouring the slurry or letting one or more droplets of the slurry fall onto a surface, wherein said surface has a temperature which is less than the temperature of the slurry, wherein the metal comprises nickel and the support is in the form of a powder, wherein the polymer has a weight average molecular weight of 1000-35000 Daltons, a glass transition temperature of at least 50° C., and a viscosity of at most 1000 cP, as measured by a Brookfield viscometer using a spindle no. 3 at 50 rpm and at a temperature of 300° C., and wherein the amount of polymer used is at least 60 wt. %, based on the total weight of the metal catalyst on the support and the polymer.

16. The process of claim 15, wherein the hydrocarbon resin feedstock is a C5 or C9 hydrocarbon resin feedstock.

17. The process of claim 15, wherein the hydrogenation is carried out in a slurry.

* * * * *